United States Patent [19]
Yamada

[11] Patent Number: 5,433,153
[45] Date of Patent: Jul. 18, 1995

[54] AMUSEMENT TRACK RIDE SYSTEM WITH HELICAL SPINNING SECTION HAVING LOCKING RESTRAINTS AND ENHANCED PASSENGER VIEW

[75] Inventor: Kazuo Yamada, Tokyo, Japan

[73] Assignee: Togo Japan Inc., Tokyo, Japan

[21] Appl. No.: 153,804

[22] Filed: Nov. 16, 1993

[30] Foreign Application Priority Data

Nov. 17, 1992 [JP] Japan ............................ 4-332353
Apr. 9, 1993 [JP] Japan ............................ 5-083557

[51] Int. Cl.6 ............................................ A63G 31/02
[52] U.S. Cl. ............................ 104/63; 104/75; 104/241; 297/484; 297/486
[58] Field of Search ............ 104/53, 56, 63, 75, 104/241; 280/748, 753; 297/410, 464, 483, 484, 486

[56] References Cited

U.S. PATENT DOCUMENTS

| | | | |
|---|---|---|---|
| 893,542 | 7/1908 | Pohle | 297/464 |
| 1,038,175 | 9/1912 | Miller | 104/241 |
| 1,597,491 | 8/1926 | Traver | 104/241 |
| 4,005,877 | 2/1977 | Humphries . | |
| 4,170,943 | 10/1979 | Achrekar | 104/56 |
| 4,522,426 | 6/1985 | Weman | 297/486 X |
| 4,700,632 | 10/1987 | Schmutz | 297/486 X |
| 4,724,771 | 2/1988 | Yamada . | |
| 4,831,937 | 5/1989 | Yamada . | |

FOREIGN PATENT DOCUMENTS

| | | | |
|---|---|---|---|
| 848771 | 9/1952 | Germany . | |
| 3237684 | 4/1983 | Germany . | |
| 55-40852 | of 0000 | Japan . | |
| 51-100531 | of 0000 | Japan . | |
| 62-129071 | 6/1987 | Japan . | |
| 2109252 | 6/1983 | United Kingdom | 104/53 |

Primary Examiner—Robert J. Oberleitner
Assistant Examiner—S. Joseph Morano
Attorney, Agent, or Firm—Merchant, Gould, Smith, Edell, Welter & Schmidt

[57] ABSTRACT

An amusement track ride system comprises a pair of rails forming a track including a spinning section. A car traveling along the rails includes a chassis, a passenger seat on the chassis, and a plurality of wheel portions situated close to the feet of a passenger in a passenger seat. In the spinning section, the rails extend in a helix along an inner surface of an imaginary cylinder having a central axis, the diameter of the imaginary cylinder being set so that the axis of helical rotation of the car traveling in a spin along the rails passes through the car and is substantially in alignment with the central axis of the imaginary cylinder. The holding device has a shoulder retainer provided at the back rest for holding down the shoulders of the passenger in the passenger seat from above. The retainer is guided by a guide mechanism to be movable in the extending direction of the seat back rest, and locked by a locking mechanism in a position where the retainer abuts against the passenger's shoulders.

23 Claims, 9 Drawing Sheets

AMUSEMENT TRACK RIDE SYSTEM WITH HELICAL SPINNING SECTION HAVING LOCKING RESTRAINTS AND ENHANCED PASSENGER VIEW

BACKGROUND OF THE INVENTION

1. Field of the Invention

The present invention relates to amusement track ride systems, such as roller coasters, loop coasters, twist coasters, etc., which comprise a track formed of a pair of rails and a car traveling along the track, and are located in amusement parks and the like.

2. Description of the Related Art

Conventionally, a loop coaster is known as an example of an amusement track ride system in an amusement park or the like. In this coaster, a track is formed of a pair of rails on which a car can travel. A loop section is formed in the middle of the track such that the car is subjected to a force for looping as it passes through the loop section. Although the loop coaster of this type can provide the fun of a ground simulation of stunt flying of an airplane, however, the simple looping is just a monotonous sport.

Accordingly, the inventor hereof previously developed a track ride system in which a car can travel spinning on a track. This system is also described in Jpn. Pat. Appln. KOKOKU Publication No. 3-24880, and its practical models, called ultra-twisters, are already at work in amusement parks and the like in various places.

In the track ride system of this type, the track is provided with a partial spinning section. The spinning section is twisted around a middle line between a pair of rails which are formed of a pipe member each. The rails are supported by means of a number of hoops, which are coaxially arranged side by side in the traveling direction of the car. The hoops are coupled together at predetermined distances from one another by means of a plurality of support beams, which are arranged at regular intervals in the circumferential direction of the hoops. The hoops and the support beams constitute a tunnel-shaped structure or imaginary cylinder which extends in the traveling direction of the car. The paired rails are fixed to each hoop at an angular distance of about 180° from each other, in the circumferential direction, so that the middle line between the twisted rails is substantially in alignment with the center line of the imaginary cylinder. Thus, the center line of each twisted rail is in alignment with the center line of the imaginary cylinder.

The car traveling along the paired rails is situated between the rails, and is connected thereto by means of wheels on either side of the car. In this arrangement, the car travels along the center line of the imaginary cylinder while spinning along the wall of the cylinder.

More specifically, the car has a chassis which extends in the traveling direction, and a plurality of passenger seats are arranged in front and in rear on the chassis. A ring-shaped front frame is provided on the front portion of the chassis, and a plurality of front wheels are rotatably mounted on each lateral side of the front frame. A rear support is provided on the rear portion of the chassis, and a cross frame, which extends in a direction perpendicular to the transverse direction, is attached to the rear support for vertical rocking motion by means of a support shaft (longitudinal bogie shaft). A plurality of rear wheels are rotatably mounted on each lateral side of the cross frame.

The front and rear wheels are individually in rolling contact with the topside, underside, and inside of each rail, and hug the rails lest derailment be caused.

The car travels along the rails as the wheels rotate. Since the rails are spun in a helix, the car runs straight in a spin. In this case, the center of spinning of the car is set so as to be substantially in alignment with the middle line between the paired rails or the center line of the imaginary cylinder.

According to the track ride system constructed in this manner, the car runs straight in a spin as it passes through the spinning section, so that passengers can enjoy spinning which is more varied than conventional looping.

Since the center of spinning of the car is substantially in alignment with the center line of the imaginary cylinder, in this case, the spinning center line agrees with a center line for traveling. Thus, there is no possibility of a substantial centrifugal force acting on the car, so that the passengers can be protected against an excessive centrifugal force, and the influence of gravity can be reduced.

According to the conventional track ride system described above, however, the car is situated between the paired rails arranged at an angular distance of 180° C. from each other in the circumferential direction, and the center of its spinning is substantially in alignment with the middle line between the rails or the center line of the imaginary cylinder. Accordingly, the elevation of the seats is relatively low as compared with the rails, and the eye level of the passengers is close to the height of the rails on either side. Inevitably, therefore, the passengers'0 view is narrowed by the rails.

Since the rails are situated near the passengers' eye level, moreover, the front and rear wheels are also situated close to the eye level, thereby narrowing the field of vision of the passengers. Moreover, the passengers will be frightened at the wheels rotating beside their faces at high speed. Use of a safety protector or cover to conceal the wheels entails an increase of essential components in number, and therefore, a complicated construction.

Meanwhile, the aforementioned ride system, such as a twist coaster or loop coaster, requires use of means for holding the body of each passenger in the car, in order to prevent the passenger from being thrown off the car by centrifugal force or gravity. Conventionally, one such means for an amusement ride system is described as a body holding apparatus in Jpn. Pat. Appln. KOKAI Publication No. 51-100531. This holding apparatus comprises a U-shaped arm, which is rockably mounted on the back rest of each seat of a car running along a looped or twisted course, and covers and holds down the upper part of the passenger's body, including the shoulders and the belly.

Since the rocking arm of this type has a fixed rocking center around which it is rocked downward, however, it sometimes cannot satisfactorily hold down the passenger's body, depending on the body dimensions. If the passenger is too small in stature or sitting height, there is a possibility of a gap being formed between the shoulders and the proximal end portion of the vertical-type rocking arm near the rocking center. If the passenger's stature or sitting height is too great, in contrast with this, the arm engages the passenger's shoulders at its proximal end, and its rocking motion is checked. Thus, the distal end of the arm fails to reach the breast or belly, possibly lifting.

To cope with this, the inventor hereof proposed a novel body holding apparatus described in Jpn. UM Appln. KOKAI Publication No. 55-40852. This apparatus is designed so that a pair of laterally swingable arms are used to hold down both the shoulders and the breast of each passenger. In this case, the passenger can hold the swingable arms by his or her own arms. Thus, the passenger's body can be retained steadily or with high reliability.

However, even the lateral-swing arms cannot compensate the differences between passengers in stature or sitting height, since the center of their rocking motion is fixed. More specifically, gaps may possibly be formed between the arms and the shoulders of a passenger of small stature. In this arrangement, moreover, spaces to permit the lateral swing must be provided individually on the four sides of each seat, so that a predetermined space should be secured between each two adjacent seats. Thus, it is necessary to increase the width of the car or reduce the number of seats, and therefore, the seating capacity, without increasing the car width.

SUMMARY OF THE INVENTION

The present invention has been contrived in consideration of these circumstances, and its object is to provide an amusement track ride system, in which cars can be made to travel spinning to afford good amusements, and each passenger's body can be securely held to ensure high safety without allowing rails, wheels, etc. to come into sight.

In order to achieve the above object, a ride system according to the present invention comprises a pair of rails forming a track and a car traveling along the rails. The car includes a chassis, a passenger seat on the chassis, and a plurality of wheel portions on the chassis, situated close to the feet of a passenger in the passenger seat and engaging the rails. The track includes a spinning section such that the paired rails extend in a helix along the inner surface of an imaginary cylinder having a central axis at the spinning section. The diameter of the imaginary cylinder is set so that the axis of helical rotation of the car traveling in a spin along the rails passes through the car and is substantially in alignment with the central axis of the imaginary cylinder.

In the ride system constructed in this manner, the rails are arranged in a helix in the spinning section, so that the car runs straight in a spin as it passes through the spinning section. In this case, the paired rails are designed so as to form a helix along the inner surface of the imaginary cylinder, and so that the axis of helical rotation of the car spinning along the rails is substantially in alignment with the central axis of the imaginary cylinder. Accordingly, the rails are situated under the car and kept away from the passenger's eye level. Thus, the passenger can enjoy a wider field of vision cleared of the wheels. Further, the wheels need not be concealed by means of any special protector or the like.

In another amusement track ride system according to the present invention, moreover, a car traveling along a pair of rails forming a track includes a chassis, a passenger seat on the chassis, and a holding device on the chassis for holding a passenger in the passenger seat. The holding device includes a shoulder retainer attached to the seat back rest and used to hold down the shoulders of the passenger in the passenger seat from above, a guide mechanism in the passenger seat for guiding the shoulder retainer for movement in the extending direction of the seat back rest, locking means for locking the shoulder retainer to prevent the retainer from moving away from the passenger's shoulders when the retainer is guided by the guide mechanism to a position where the retainer abuts against the passenger's shoulders, unlocking means for unlocking the shoulder retainer locked by the locking means, and urging means for urging the shoulder retainer to move away from the passenger's shoulders.

According to the ride system constructed in this manner, the shoulder retainer for holding down the passenger's shoulders from above is movable in the extending direction of the seat back rest or the vertical direction. Although each passenger has his or her own stature and sitting height, therefore, the shoulders can be securely held down from above by moving the retainer. Thus, the passenger's body can be securely held in a safe manner. Since the shoulder retainer is movable in the vertical direction, moreover, no special space is needed with respect to the transverse direction of the seat.

According to the present invention, moreover, the locking means includes a rack, attached to the car and formed having a number of mating teeth arranged in the vertical direction, and a plurality of retaining pawls arranged in the vertical direction on the shoulder retainer and adapted to engage the mating teeth. The pitch of the retaining pawls is different from that of the mating teeth.

In this arrangement, one of the retaining pawls engages one of the mating teeth on the rack. If the engaged retaining pawl is disengaged or damaged, therefore, the other pawl engages the mating tooth, so that the shoulder retainer cannot be unlocked, thus ensuring high safety. Since the respective pitches of the mating teeth of the rack and the retaining pawls are different, one of the retaining pawls can engage its nearest mating tooth. Thus, the engagement pitch can be shortened.

According to the present invention, moreover, the rack of the locking means is formed of a rod member having the numerous mating teeth arranged in the axial direction on one side thereof with respect to the circumferential direction, and the unlocking means slidingly unlocks the engaging tooth from the retaining pawl by rocking the rack.

In this arrangement, the retaining pawl is disengaged by rotating the rack to reorient the mating teeth in the circumferential direction. Thus, the unlocking means has a simple construction, and can be operated with ease.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 to 11 show an amusement track ride system according to an embodiment of the present invention, in which:

DETAILED DESCRIPTION OF THE PREFERRED EMBODIMENT

An amusement track ride system according to an embodiment of the present invention will now be described in detail with reference to the accompanying drawings.

Figure 1:
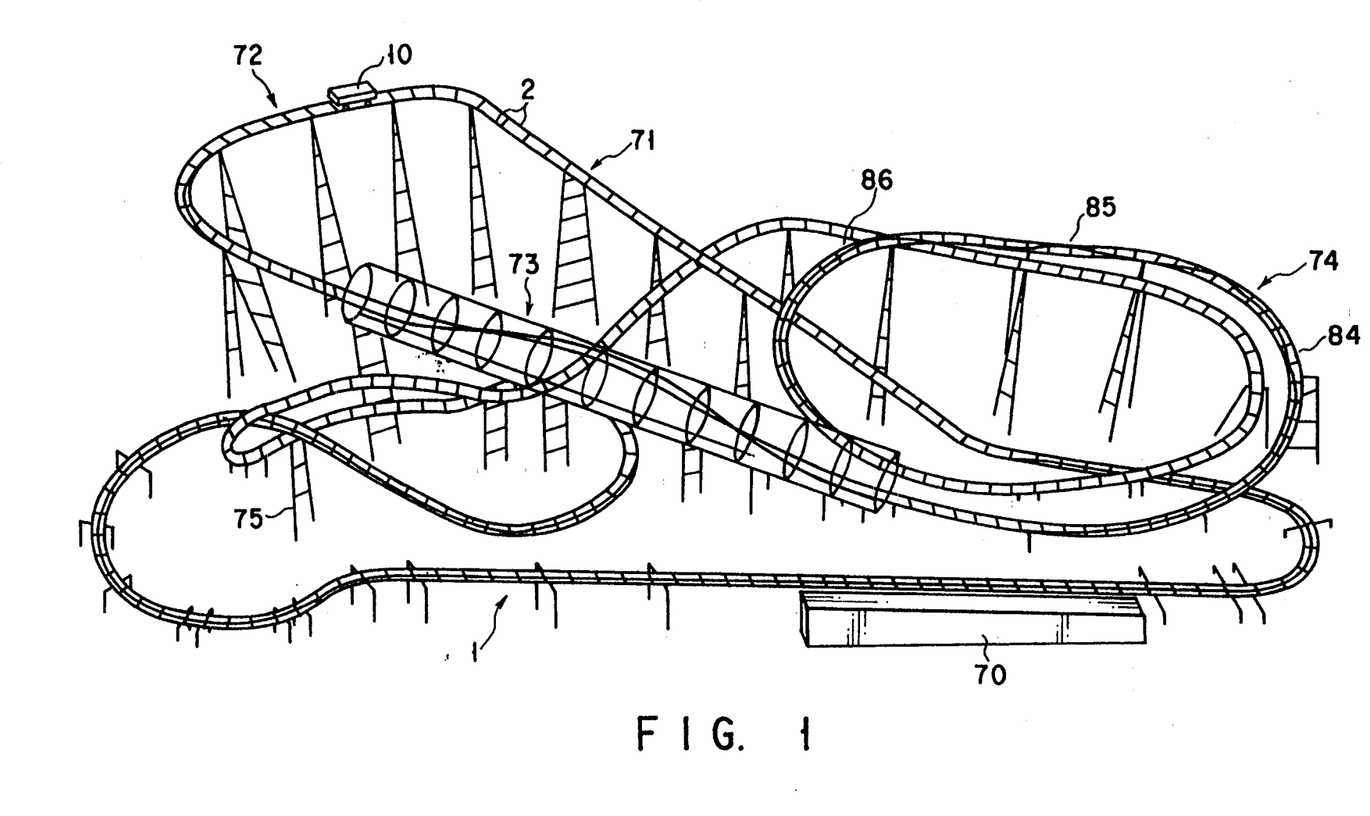
FIG. 1 is schematic view showing an outline of the ride system.

FIG. 1 schematically shows an outline of the ride system. The ride system comprises a pair of rails 2 and a train 3 of cars 10 traveling along the rails. The rails 2, which are arranged parallel to each other, constitute a track 1 in the form of an endless loop as a whole.

A platform 70 is located beside the lowest portion of the track 1, and passengers get on and off the cars 10 at the platform 70. After leaving the platform 70, the train 3 advances to a hoisting section 71, where it is pulled up an upgrade by means of a chain (not shown). The train 3 is pulled up through the hoisting section 71 to a portion 72 corresponding to the highest point of the track 1, whereupon it is released from the chain. Thereafter, the train 3 enters a gentle downgrade, and then starts to be automatically run by gravity. A straight spinning section 73 (mentioned later) is formed in this downgrade. In this spinning section 73, the train 3 falls straight in a spin. After passing through the section 73, the train 3 enters a curved spinning section 74. In this spinning section 74, the train 3 further spins as it travels along a curve, thus making a complex motion. After passing through the section 74, the train 3 moves past a plurality of curves, and then returns to the platform 70 while reducing its speed.

Having the course design described above, the track 1 is formed of the paired rails 2 which are supported by means of a number of supporting structures, such as supporting legs 75.

Figure 2:
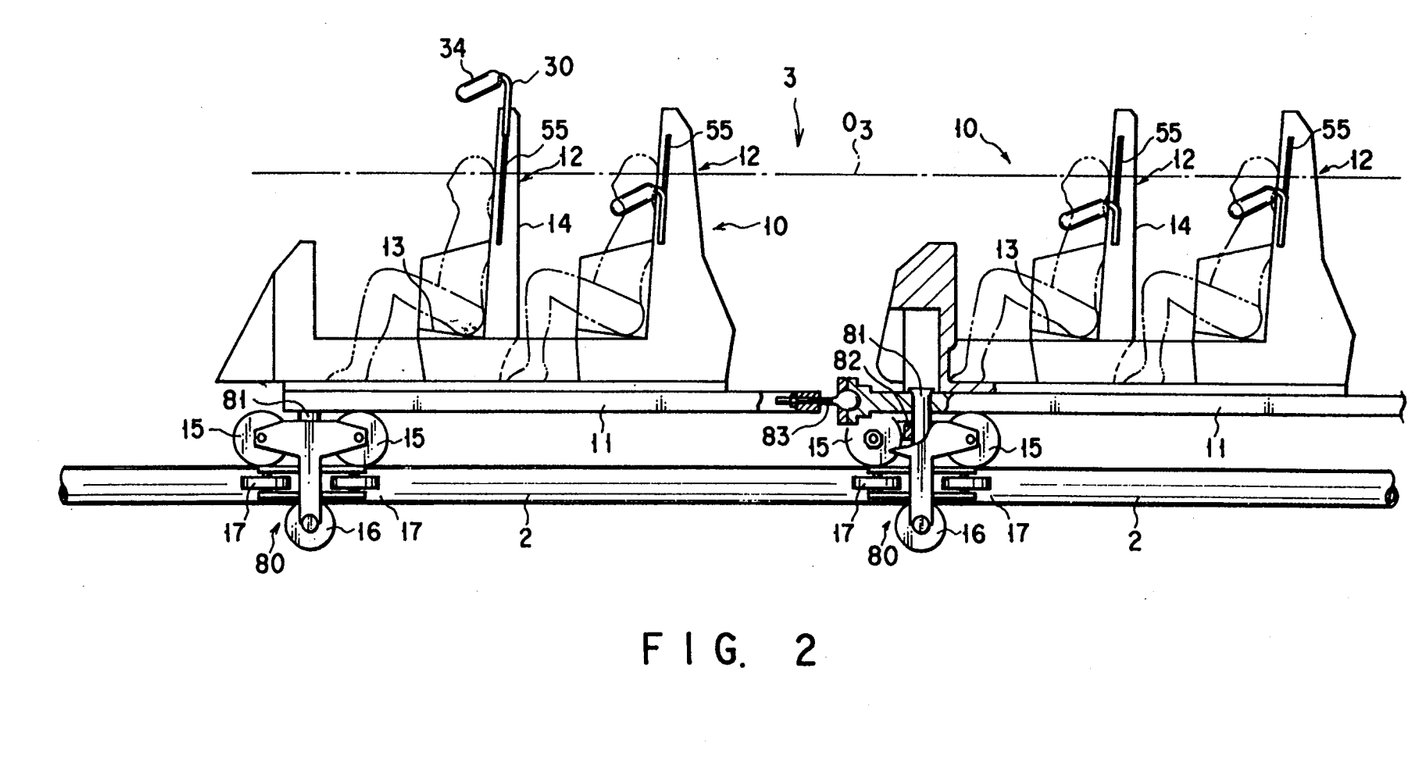
FIG. 2 is a side view showing a train of cars traveling along rails of the system.

As shown in FIG. 2, each car 10, which travels along the rails 2, includes a substantially rectangular chassis 11 extending in the longitudinal direction or traveling direction. The chassis 11 carries thereon a plurality of seats 12 for the passengers. The seats 12 are arranged in a plurality of lines, in front and in rear, on the chassis 11. In each line, the seats are arranged side by side in the transverse direction of the chassis 11. Each seat 12 includes a seating face 13 and a seat back rest 14 extending upward from the seating face.

Figure 4:
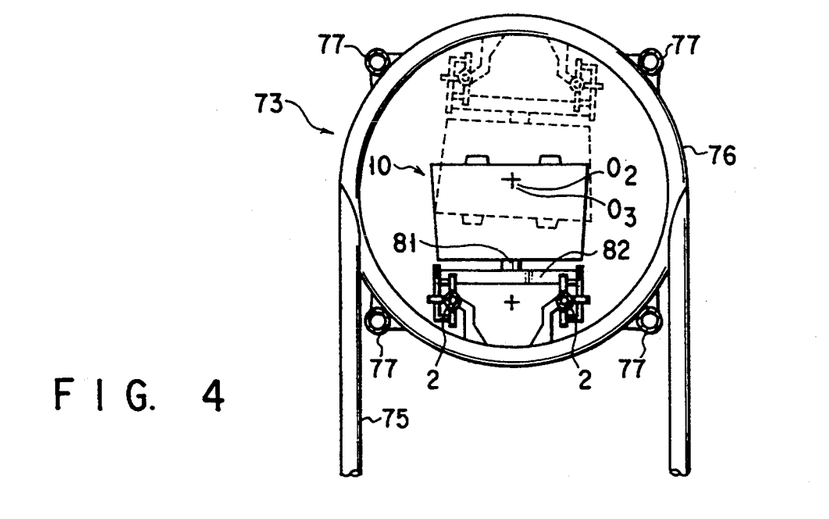
FIG. 4 is a sectional view taken along line IV—IV of FIG. 3, showing the positional relationships between the rails and the train established when the train travels through the straight spinning section.

As shown in FIGS. 2 and 4, wheel portions 80, which are in engagement with their corresponding rails 2, are arranged individually at the two corners on the front end side of the bottom of the chassis 11. More specifically, a rotatable support shaft (vertical bogie shaft) 81 extends vertically downward from the center of the front end portion of the chassis 11. A front cross frame 82 is attached to the extended end of the shaft 81 so as to extend at right angles to the rails 2. The wheel portions 80 are mounted individually on the right and left end portions of the frame 82. Thus, the wheel portions 80 can swing around the shaft 81, from side to side with respect to the advancing direction of the train 3.

Each two adjacent cars 10 are coupled to each other by means of a ball Joint 83 for use as coupling means, which is interposed between the respective centers of the rear end of the front car and the front end of the rear car. With use of the ball Joint 83, the rear car 10 can swing freely in a desired direction with respect to the front car 10. The rearmost car (not shown) is provided with wheel portions which are arranged individually at the four corners of the underside of the chassis 11.

Each wheel portion 80 includes a pair of tractor wheels 15 in rolling contact with the topside of its corresponding rail 2, an upstop wheel 16 in rolling contact with the underside of the rail, and a pair of guide wheels 17 in rolling contact with the outside of the rail. Thus, the wheel portion 80 hugs the rail from the topside, underside, and outside thereof lest derailment be caused.

As the wheels roll on the rails 2, each car 10 travels along the rails. While the car 10 is running along the rails 2, the rails 2 are always situated on the bottom side of the car, that is, under the feet of the passengers in the seats 12.

The following is a description of the straight and curved spinning sections 73 and 74 of the track 1.

Figure 3:
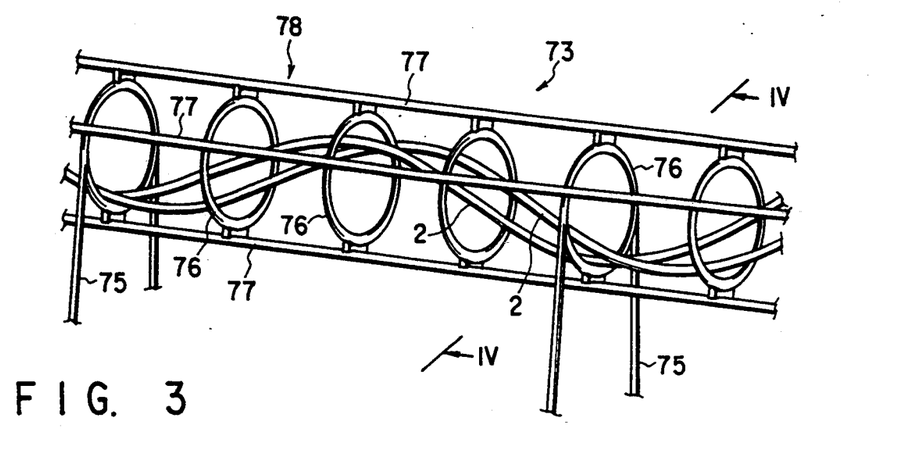
FIG. 3 is a perspective view showing a straight spinning section of a track of the system.

As shown in FIGS. 1, 3 and 4, the straight spinning section 73 includes a number of hoops 76 to which the rails 2, formed of a pipe each, are fixed. The hoops 76 have the same diameter, and are arranged coaxially at regular intervals in the traveling direction of the train 3. Also, the hoops 76 are coupled to one another by means of a plurality of support beams 77, e.g., four in number, which extend in the traveling direction of the train 3. The support beams 77 are arranged at regular intervals in the circumferential direction of the hoops 76. The hoops 76 and the beams 77 constitute a tunnel-shaped structure or imaginary cylinder 78 which extends in the traveling direction of the train 3. The structure 78 is in the form of a straight cylinder having a straight central axis O2, and slightly declines from the highest portion 72 of the track 1. This downgrade is designed so that the train 3 is subjected to a predetermined centrifugal force produced by its helical motion which accompanies the passage of the train 3 through the straight spinning section 73, which will be described later.

The paired rails 2 helically extend along the inner surface of the imaginary cylinder 78, and are fixed to the individual hoops 76. Thus, the rails 2 look as if they are stuck to the inner surface of the structure 78, and their central axis of the helical rotation is in alignment with the central axis O2 of the structure 78. An intermediate axis O1, which extends halfway between the rails 2, is a helical axis deviated from the central axis O2 of the structure 78. The lead angle of the helical rails 2 is set in consideration of the traveling speed of the train 3 lest the cars 10 be subjected to an excessive centrifugal force. Also, the lead angle is substantially fixed throughout the length of the spinning section 73.

Since the rails 2 are thus spun in a helical manner, the train 3 on the rails 2 advances helically or in a spin along the inside of the imaginary cylinder 78. As shown in FIGS. 2 and 4, the inner diameter of the structure 78, that is, the diameter of a helix the rails 2 form, is set so that the central axis O2 is in alignment with the helical rotation axis O3 of the train 3, and more specifically, that the rotation axis O3 extends through the train 3 and is on the same level as the heads of the passengers in the seats 12 of each car 10. The intermediate axis O1 between the rails 2 is off the central axis O2 of the imaginary cylinder 78. As each car 10 passes through the straight spinning section 73, therefore, the wheel portions 80 run twisting or spinning around the central axis O2, although the passengers' heads simply rotate around the rotation axis O3.

The following is a description of the way the train 3 travels in the straight spinning section 73 constructed in this manner. In this spinning section 73, the rails 2 are spun helically, so that the train 3 travels straight in a spin. Thus, also in this case, the passengers can enjoy spinning which is more varied than looping.

In this case, the rotation axis O3 of the train 3 is set so that it is substantially in alignment with the central axis O2 of the imaginary cylinder 78 and passes through the headrest areas of the passenger seat, as shown in FIGS. 2 and 3. Even though the intermediate axis O1 between the rails 2 is helical, therefore, the cars 10 cannot be subjected to an excessive centrifugal force, so that the passengers can be protected against a great centrifugal force.

Figure 5:
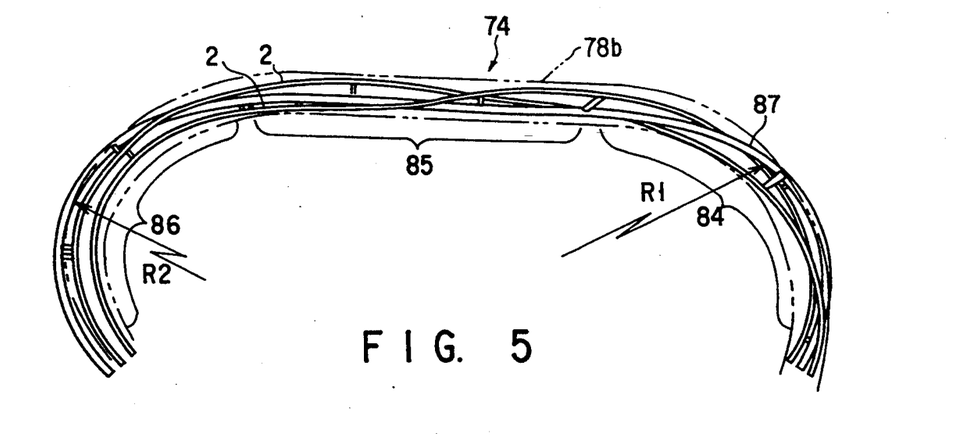
FIG. 5 is a perspective view showing a curved spinning section of the track.

Referring now to FIGS. 1 and 5, the curved spinning section 74 of the track 1 will be described.

In the curved spinning section 74, the course itself is curved. Specifically, the rails 2 are supported by a frame member 87. The frame member 87 includes a first half portion constituting a quarter-round curve 84 with a curvature radius R1, a second half portion constituting a quarter-round curve 86 with a curvature radius R2, and a straight portion 85 connecting these curves 84 and 86.

The rails 2 are spun in the section between the starting point of the first-half curve 84 and the end of the second-half curve 86 so that the train 3 makes one revolution in this section. In this case, the rails 2 are arranged along the inner surface of an imaginary cylinder 78b curved along the support frame 87 and having a constant diameter.

The following is a description of the way the train 3 travels in the curved spinning section 74. In this spinning section, a composite centrifugal force is applied to the train 3, so that the passengers can enjoy a varied bodily sensation. Thus, a centrifugal force is produced as the train 3 travels along the curves. The train 3 is continually subjected to a centrifugal force associated with its speed and the curvature radius as it travels from the starting point of the first-half curve 84 to the end of the second-half curve 86. In addition to this centrifugal force, a centrifugal force is produced when the train 3 spins around the bent central axis (traveling central axis of the imaginary cylinder 78b) of the curves 84 and 86. When the centrifugal force produced during the travel along each curve acts in the same direction as the centrifugal force produced by the spinning motion, that is, when the train 3 spins outward around the bent central axis, a great composite centrifugal force is applied to the train 3 or cars 10. When the centrifugal force produced during the travel along each curve acts in the opposite direction to the centrifugal force produced by the spinning motion, that is, when the train 3 spins inward around the bent central axis, on the other hand, the two centrifugal forces offset each other, so that the resultant centrifugal force acting on the train 3 gets small.

As the train 3 travels spinning in the curved spinning section 74, therefore, a large centrifugal force acts in some region, and a smaller one in another. Accordingly, the passengers in the train 3 can enjoy a wafting sensation at some time and a sinking sensation under gravity at another. Thus, in this case, the passengers can experience a bodily sensation different from that produced by the straight spinning motion, thereby enjoying a varied amusement sensation.

In case of the amusement track ride system having the construction and functions described above, as seen from FIG. 2, the rails 2 are situated under the cars 10 and kept away from the eye level of the passengers in the seats 12. Accordingly, there is no possibility of the rails 2 obstructing the view of the passengers, so that the passengers can enjoy a wide field of vision. Also, the wheels 15, 16 and 17 of the wheel portions 80 are arranged at the bottom portion of each car 10, so that a wide view can be secured without being obstructed by the wheels.

In this arrangement, the passengers can fully enjoy both a varied motion of the train 3 and a thrilling view. Since the wheels 15, 16 and 17 are located far away from the passengers, moreover, they need not be covered by means of any special protectors or the like. Accordingly, necessary components are reduced in number, so that the construction can be simplified.

As mentioned before, the train 3 spins as it passes through the straight and curved spinning sections 73 and 74, so that the passengers' bodies are inverted a plurality of times. Each seat 12 of each car 10 is provided with a body holding unit 20 which can maintain the safety of the passengers even in this state. The following is a description of the unit 20.

As shown in FIGS. 6 to 10, a pair of support posts 21, right and left, are arranged in the back rest 14 of each seat 12. The support posts 21 are set up on the chassis 11. A support plate 23 is mounted on the support posts 21 by means of a plurality of brackets 22, and a guide rail 24 is fixed to the plate 23. The guide rail 24 vertically extends parallel to the support posts 21, and has a substantially trapezoidal cross section spread forward.

A pair of shoulder retainer arms 30 are mounted on the guide rail 24 for vertical movement. The respective proximal ends of the arms 30 are fixed to a coupling plate 31, and a slide bush 32 is fixed to the plate 31. The bush 32 is formed having a dovetail groove 33, and the rail 24, having the substantially trapezoidal cross section, is slidably fitted in the groove 33. In this arrangement, the coupling plate 31 vertically slidable along the guide rail 24, so that the shoulder retainer arms 30 can move up and down, that is, in the extending direction of the seat back rest 14, along the rail 24. Thus, the guide rail 24, coupling plate 31, and slide bush 32 constitute a slide mechanism according to the present invention.

The paired shoulder retainer arms 30 extend obliquely downward and forward from the seat back rest 14 in a manner such that their respective top portions individually engage the shoulders of each passenger. An elastic shoulder pad 34, formed of sponge or the like, is fitted on each arm 30, covering the range from the top portion to the distal end portion thereof.

Figure 10:
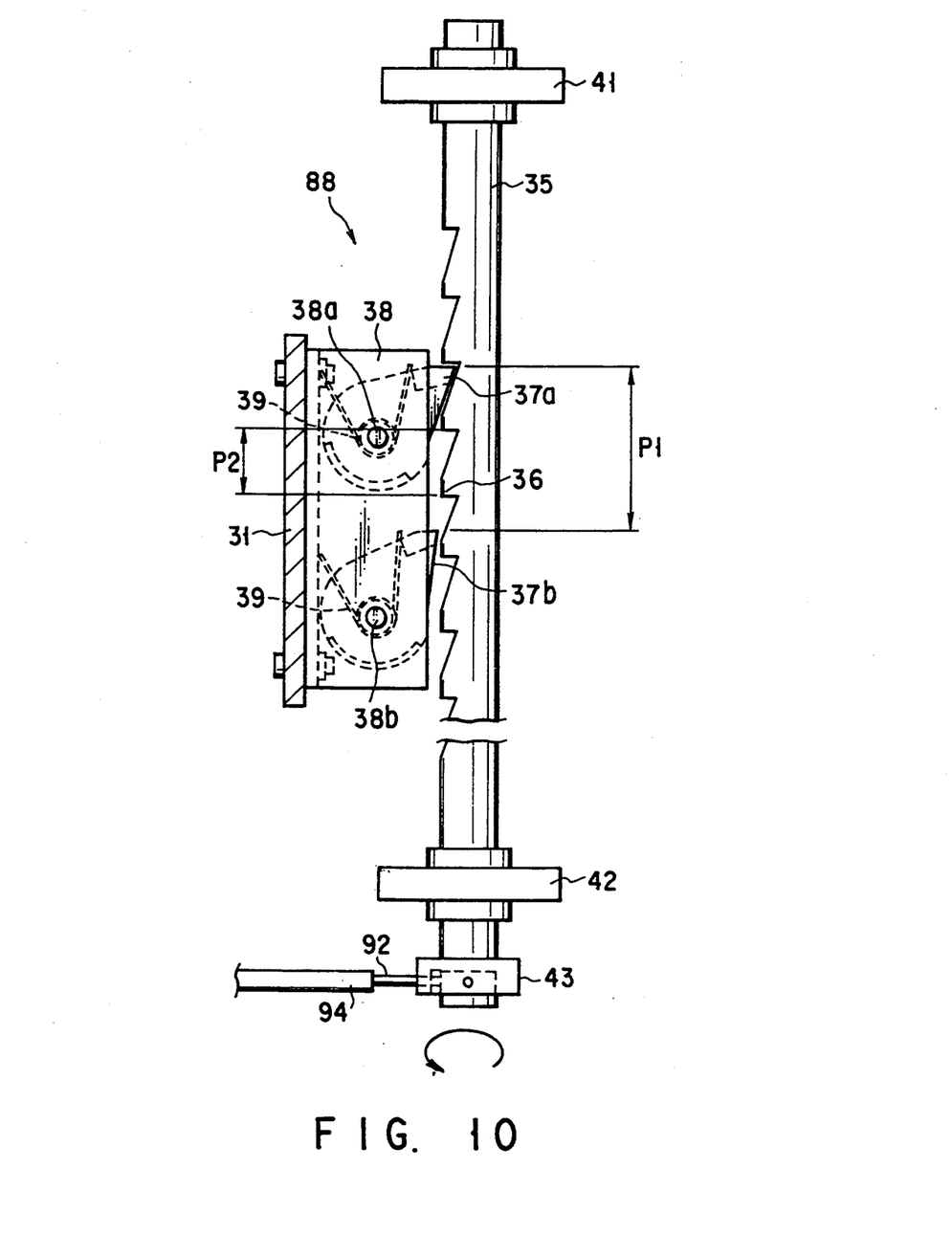
FIG. 10 is an enlarged side view showing a locking mechanism of the retaining unit.

One of the support posts 21 is fitted with a rack 35, which constitutes a locking mechanism 88, and the coupling plate 31 is fitted with, e.g., two retaining pawls 37a and 37b which also constitute the locking mechanism. The rack 35 has a body in the form of a round rod, and is formed having a number of mating teeth 36 arranged axially at regular pitches p2 on one side of the round rod with respect to the circumferential direction thereof, as shown in FIG. 10. On the other hand, a holder 38 is fixed to the coupling plate 31, and the retaining pawls 37a and 37b are rockably mounted on the holder 38 by means of pins 38a and 38b. The pawls 37a and 37b are arranged vertically at a distance or pitch p1, and are urged to rock in the clockwise direction of FIG. 10 by torsion coil springs 39, individually. In this case, the pitches p2 and p1 of the mating teeth 36 of the rack 35 and the retaining pawls 37a and 37b on the coupling plate 31 are different, and for example, p1=2.5p2 is given.

Thus, when the coupling plate 31 is lowered along the guide rail 24, the retaining pawls 37a and 37b on the plate 31 descend clearing the mating teeth 36 of the rack 35 one after another. When the plate 31 stops in some desired position, the pawl 37a or 37b engages its nearest mating tooth 36. As the retaining pawl 37a or 37b and the tooth 36 engage each other in this manner, the coupling plate 31 is prevented from moving upward, so that the paired shoulder retainer arms 30 are restrained from being raised.

The rack 35 extends parallel to the support posts 21, and its upper and lower end portions are supported for rotation around the central axis of the rack by means of holders 41 and 42, respectively, which are mounted on one of the support posts 21. An unlocking lever 43 is attached to the lower end of the rack 35. When the lever 43 is turned, the rack 35 rotates around its central axis. As a result, the mating teeth 36, arranged axially on the one side of the round rod with respect to the circumferential direction thereof, are reoriented in the circumferential direction. Thus, the mating tooth 36 slidingly moves away from the retaining pawl 37a or 37b to be disengaged therefrom.

Figure 11:
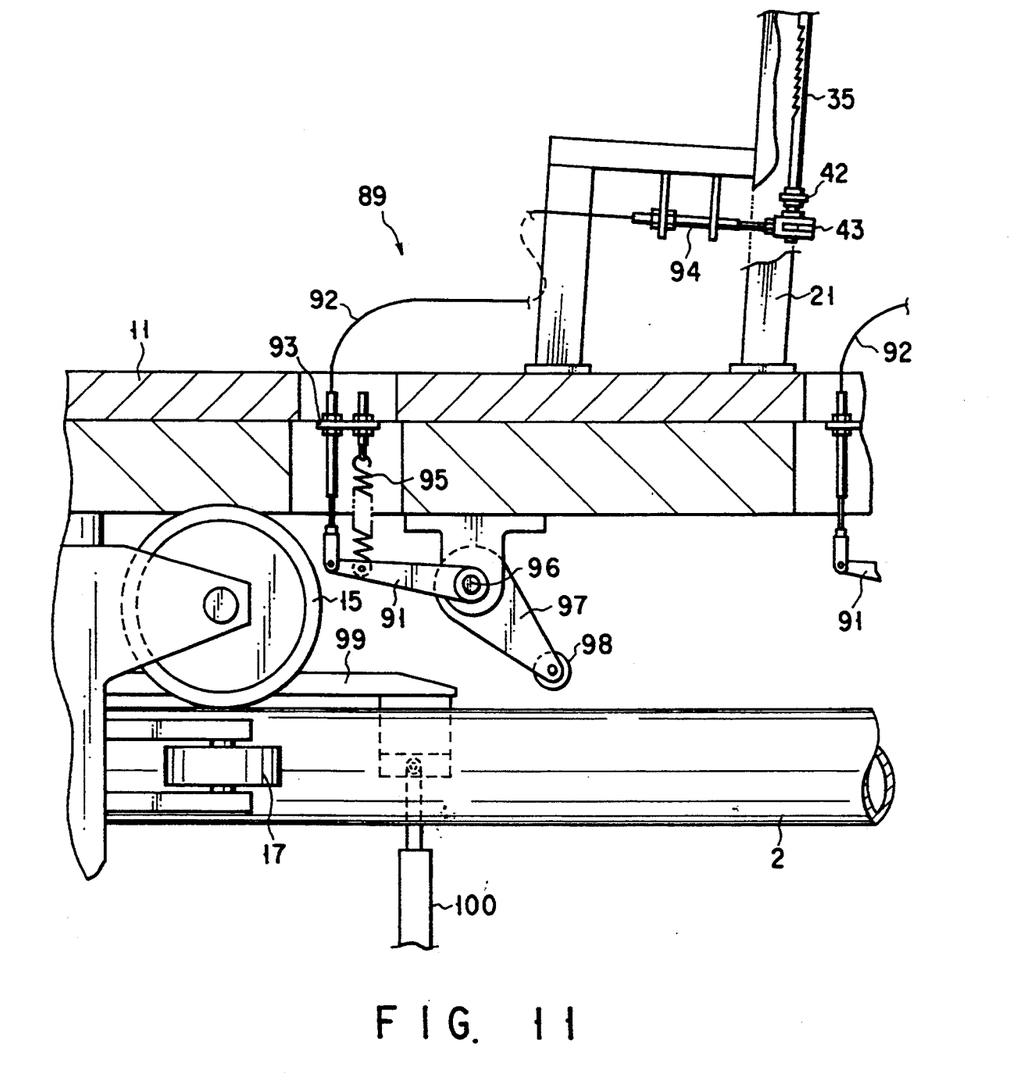
FIG. 11 is a side view showing an unlocking mechanism of the retaining unit.

As shown in FIG. 11, a rotating mechanism 89 for rotating the rack 35 includes a link 91, which is rockably mounted on the bottom surface of the chassis 11 by means of a bracket 90. The distal end of the link 91 and the unlocking lever 43 are connected to each other by means of a high-rigidity control cable 92. The link-side end portion of the cable 92 is positioned for movement in a direction perpendicular to the chassis 11 by means of a cylindrical cable holder 93 fixed to the chassis 11. The lever-side end portion of the cable 92 is guided for sliding motion in the horizontal direction or in a direction perpendicular to the rack 35 by a guide sleeve 94, which is fixed to the support post 21.

A tension spring 95, which is stretched between the link 91 and the chassis 11, urges the link 91 in the clockwise direction of FIG. 11. When the link 91 is rocked clockwise, the distal end portion of the control cable 92 is moved toward the unlocking lever 43, whereupon the rack 35 is rotated by the lever 43 to a locking position where it can engage the retaining pawl 37a or 37b. When the link 91 is rocked in the counterclockwise direction, on the other hand, the distal end portion of the cable 92 is pulled away from the lever 43. Thereupon, the rack 35 is rotated to an unlocking position where the engaging tooth 36 is disengaged from the pawl 37a or 37b.

A lever 97 is fixed to a rocking shaft 96 of the link 91 so as to be rockable integrally with the link 91. A guide roller 98 is mounted on the distal end of the lever 97. Corresponding to each car 10, a cam plate 99 is located in a predetermined car stop position at the platform 70. Under the control of a control device (not shown) or through a supervisor's operation, the cam plate 99 is moved, by means of a hydraulic cylinder 100, between an up position where it engages the guide roller 98 from below and a down position where it is separated from the roller 98. The plate 99 and the cylinder 100 constitute operating means according to the present invention.

When the cam plate 99 is moved to the up position after each car 10 is stopped at its predetermined stop position, the guide roller 98 is pushed up by the cam plate, so that the lever 97 is rocked in the clockwise direction of FIG. 11. In response to this, the link 91 also rocks in the clockwise direction, so that the rack 35 is rotated to the unlocking position through the medium of the control cable 92 and the unlocking lever 43. This unlocking operation is accomplished at a stroke with the respective unlocking levers 43 of all the seats 12 associated with one another, under the control of the control device or on the basis of the supervisor's operation at the platform 70. Thus, the passengers need not perform troublesome unlocking operation, and moreover, they can be prevented from operating the unlocking levers 43 out of mischief while the train 3 is running.

When the cam plate 99 is moved to the down position after the passengers get off each car 10, the lever 97 and the link 91 are rocked counterclockwise by means of the urging force of the spring 95, and the rack 35 is rotated to the locking position by the control cable 92.

Thus, the unlocking lever 43 and the rotating mechanism 89 for rotating the rack 35 constitute an unlocking mechanism.

Figure 6:
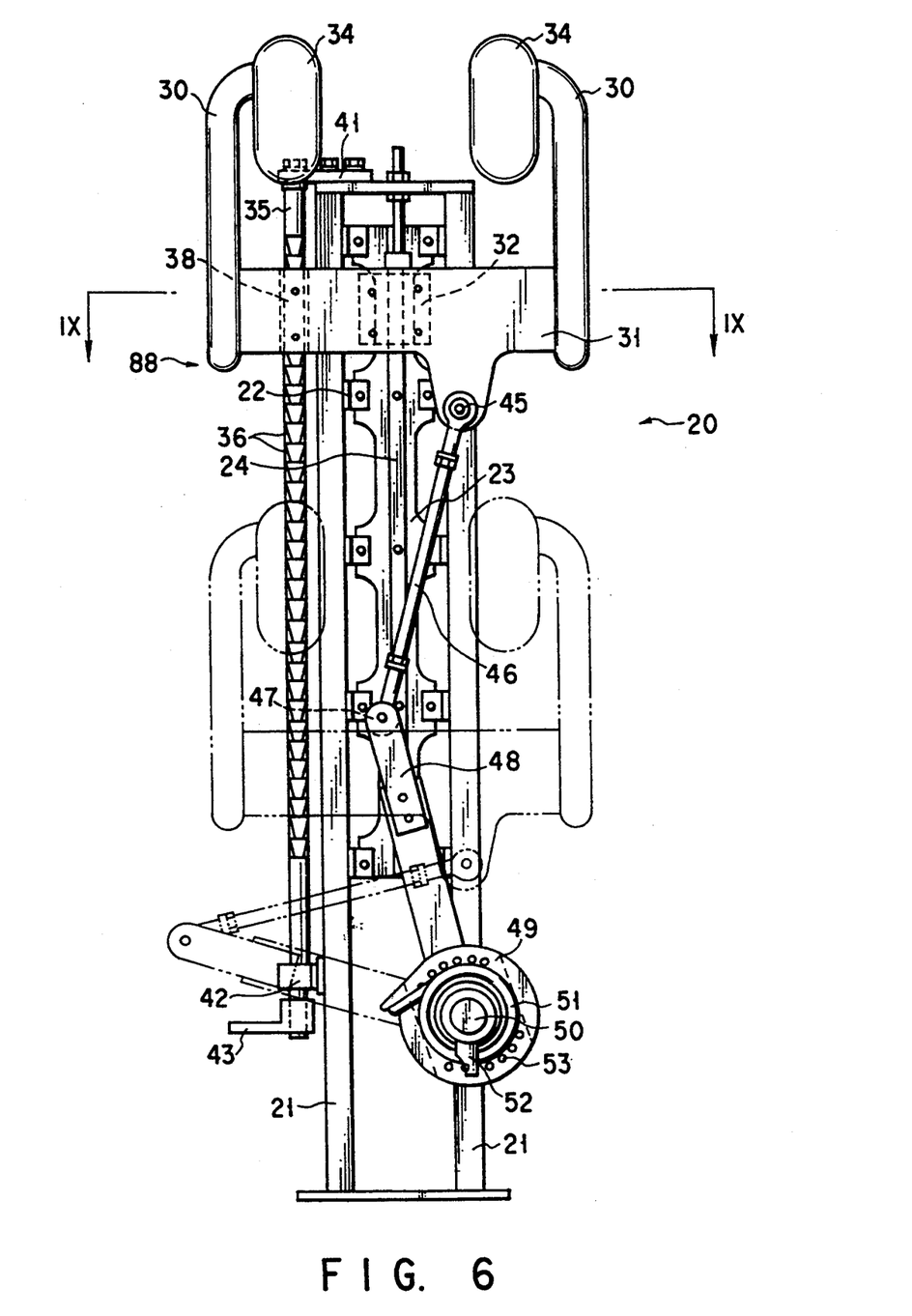
FIG. 6 is a front view of a body holding unit attached to each car.
Figure 7:
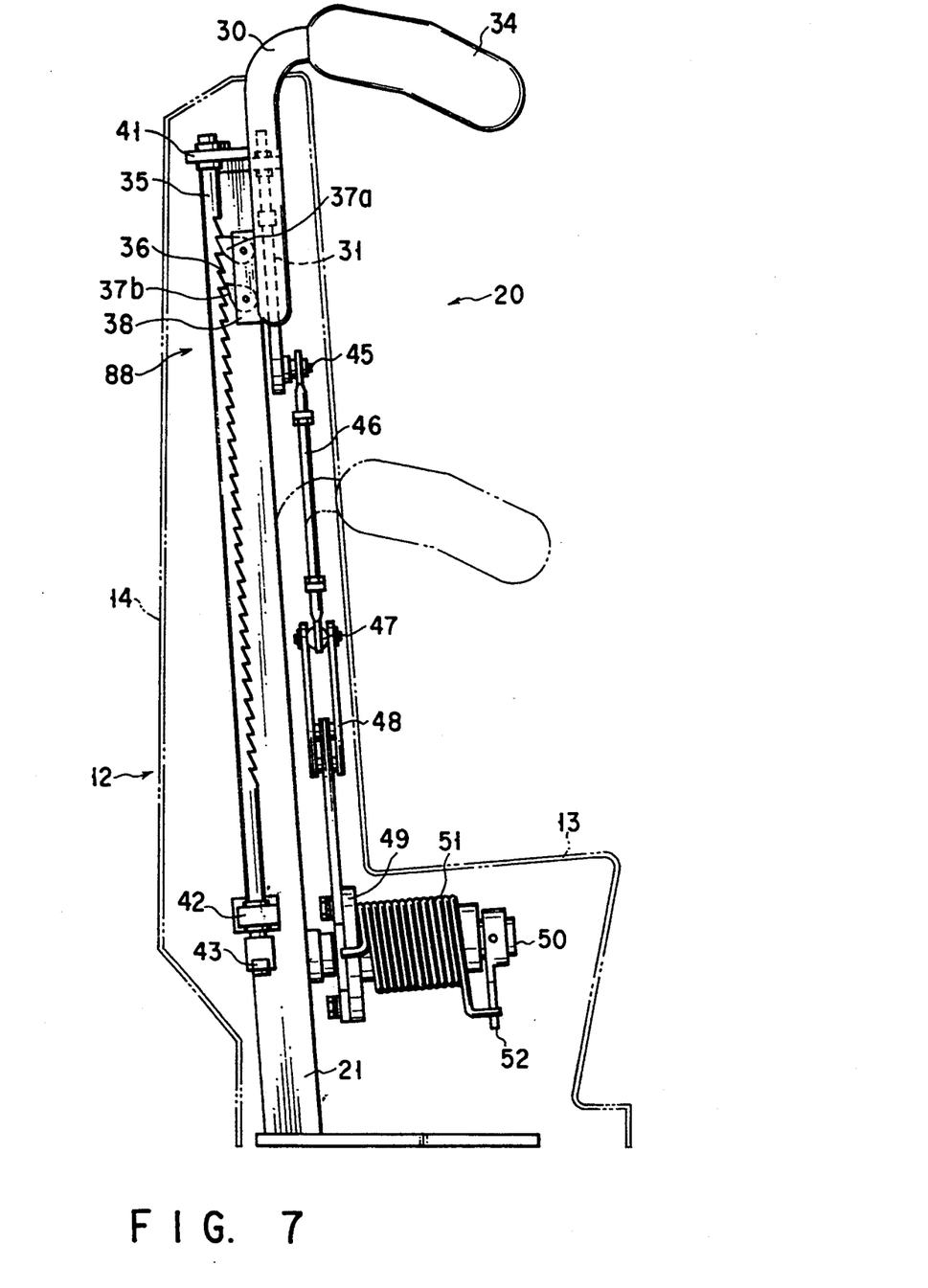
FIG. 7 is a side view of the body holding unit taken in one direction.
Figure 8:
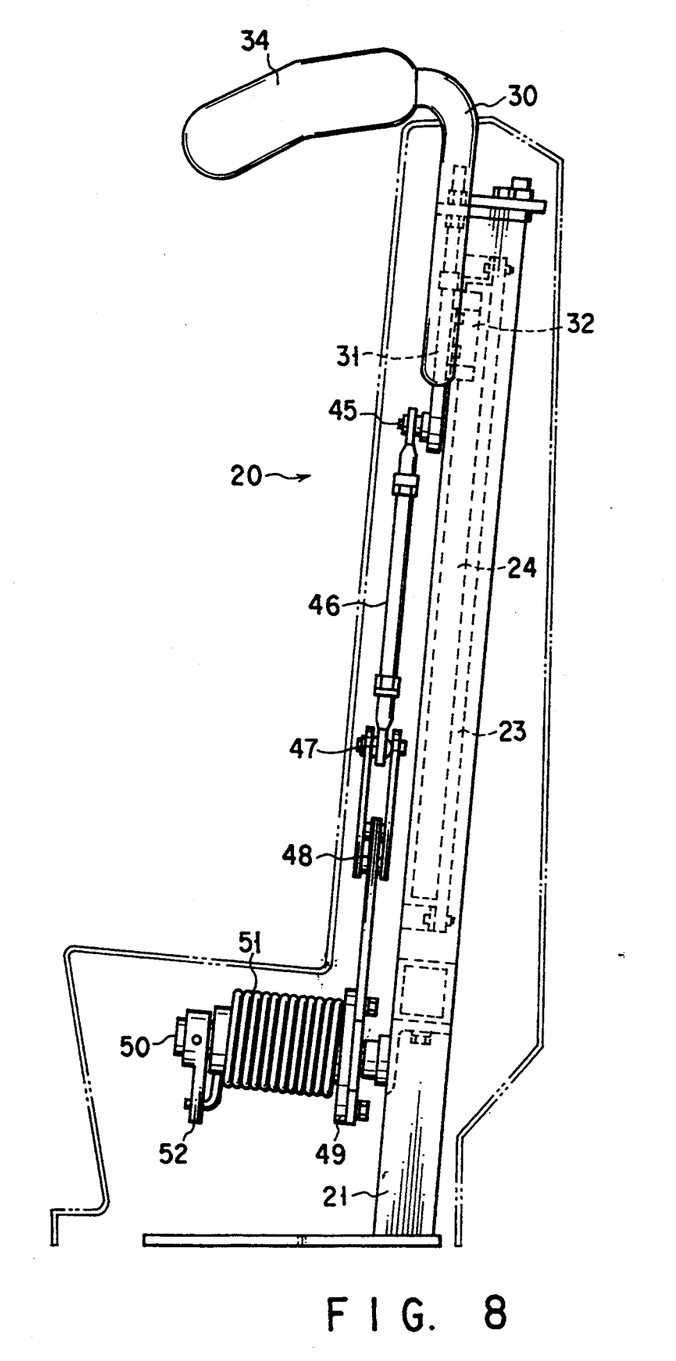
FIG. 8 is a side view of the holding unit taken in the other direction.
Figure 9:
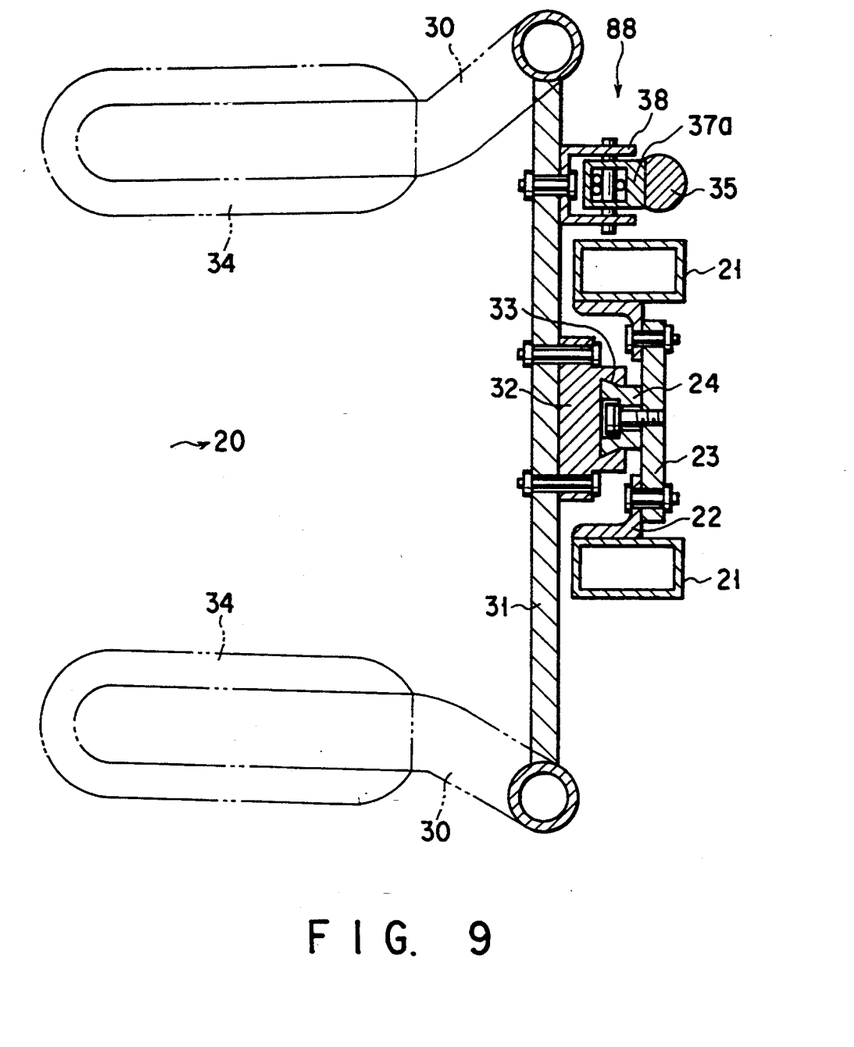
FIG. 9 is a sectional view taken along line IX—IX of FIG. 6.

As shown in FIGS. 6 to 8, one end of a turnbuckle 46 is rotatably coupled to the coupling plate 31 by means of a rocking pin 45. The other end of the turnbuckle 46 is rotatably connected to the distal end of a link lever 48 by means of a universal joint 47. The proximal end of the lever 48 is fixed to a ring member 49.

The ring member 49 is rotatably mounted on a support shaft 50 which is attached to the other support post 21. A torsion coil spring 51 is wound around the shaft 50. One end of the spring 51 is anchored to the ring member 49, and the other end to a hook 52 formed on the shaft 50. The torsion spring 51 urges the ring member 49 to rotate in the clockwise direction of FIG. 6. Thereupon, the link lever 48 is integrally rotated clockwise, so that the lever 48 and the turnbuckle 46 are stretched to push up the coupling plate 31. Thus, the paired shoulder retainer arms 30 are urged to be pushed up by the spring 51.

In FIG. 6, numeral 53 denotes a plurality of holes for mounting position adjustment, which are used to mount the proximal end of the link lever 48 on the ring member 49. With use of these holes 53, the angle at which the lever 48 is mounted on the member 49 can be selected.

The ring member 49, support shaft 50, torsion coil spring 51, etc. are located under the seating face 13 of the seat 12. As shown in FIG. 2, the paired shoulder retainer arms 30 project to the outside from the side faces of the back rest 14 of the seat 12, individually. The back rest 14 is formed having slits 55 along which the arms 30 can move up and down.

The following is a description of the operation of the body retaining unit 20 constructed in this manner.

When the train 3 is stopped at the platform 70, the passengers take their seats 12 in the cars 10, as shown in FIG. 2. Then, the shoulder retainer arms 30 are pulled down against the urging force of the torsion coil spring 51 so that their respective elastic pads 34 abut against the shoulders.

Thereupon, the shoulder retainer arms 30 and the coupling plate 31 supporting them slide guided by the slide bush 32 and the guide rail 24, and the retaining pawl 37a or 37b on the coupling plate 31 indecent clearing the mating teeth 36 of the rack 35 one after another. When the arms 30 stop where the elastic pads 34 abut against the passenger's shoulders, the pawl 37a or 37b engages its nearest mating tooth 36. Thus, upward movement of the coupling plate 31 is arrested by the engagement between the pawl 37a or 37b and the tooth 36, so that the retainer arms 30 are prevented from ascending. As a result, the arms 30 are locked in the position where their elastic pads 34 are in engagement with the passenger's shoulders.

In this state, the train 3 travels along the rails 2 in a predetermined course. In the meantime, the bodies of the passengers in the seats 12 cannot be lifted since their shoulders are pressed by means of the shoulder retainer arms 30. In this case, safety can be further ensured by holding down the lower part of the body of each passenger, such as the lap or loins, by means of a seat belt or other body holding means.

When the train 3 traveling on the track returns to the platform 70 and stops at the stop position, the unlocking lever 43 is rocked by means of the rotating mechanism 89. As a result, the rack 35 is rotated around its central axis to the unlocking position, so that the mating teeth 36, arranged axially on the one side of the round rod with respect to the circumferential direction thereof, are reoriented, and the mating tooth 36 is disengaged from the retaining pawl 37a or 37b. When the paired shoulder retainer arms 30, unlocked in this manner, are pushed up, they are disengaged from the shoulders, so that the passenger's body is released from the hold.

The shoulder retainer arms 30 can be raised automatically or with a small force under the urging force of the torsion coil spring 51 for ascent. More specifically, the spring 51 urges the ring member 49 to rotate in the clockwise direction of FIG. 6. Thereupon, the link lever 48 is rocked clockwise, so that the lever 48 and the turnbuckle 46 are stretched to push up the coupling plate 31. Thus, the urging force of the torsion coil spring 51 is converted into a force to push up the retainer arms 30. If the urging force of the spring 51 is augmented, the arms 30 can be pushed up automatically when they are unlocked. If the urging force of the spring 51 is made to be relatively small, the force to push up the arms 30 matches with the weight of the arms 30 and the coupling plate 31 when they are unlocked, so that the arms 30 can be raised with a small force.

In the case of the arrangement of the present embodiment, the paired shoulder retainer arms 30 of each seat 12 are vertically slid along the seat back rest 14, so that they can be pulled down to a desired position although the passengers have their respective statures and sitting heights. Accordingly, the arms 30 never fail to be held against the shoulders of the passengers of different body dimensions. Thus, no gaps can be formed over the shoulders, so that there is no possibility of the passengers' bodies being lifted while the train 3 is running.

Since the shoulder retainer arms 30 slide vertically, moreover, they are moved in the vertical direction of the train 3, so that any special spaces need not be secured on the right- and left-hand sides of each seat. Thus, the space between each two adjacent seats can be narrowed, the width of each car can be reduced, or the number of seats in each row can be increased. The increased seat number results in an improvement in cost performance.

Furthermore, the guide mechanism and the locking mechanism 88 according to the present embodiment can be formed inside the back rest 14 of each seat 12, so that the back rest 14 as a dead space can be utilized effectively. Since the torsion coil spring 51, which requires a wide three-dimensional space, is located under the seating face 13, the coefficient of space utilization is further improved.

The locking mechanism 88 of the above-described embodiment is composed of the rack 35 attached to the one support post 21 and the two retaining pawls 37a and 37b on the coupling plate 31, and one of the retaining pawls engage one of the mating teeth 36 on the rack 35. If the one retaining pawl 37a or 37b is disengaged from the engaging tooth 36 or damaged, therefore, the other pawl 37b or 37a engages the tooth 36, so that the shoulder retainer arms 30 cannot be separated wide from the shoulders. Thus, the locking mechanism 88 ensures high safety.

Since the pitches p2 and p1 of the mating teeth 36 of the rack 35 and the retaining pawls 37a and 37b on the coupling plate 31 are different (e.g., p1=2.5p2), either the pawl 37a or 37b can engage its nearest mating tooth 36. Thus, the engagement pitch can be shortened, so that the accuracy of engagement can be improved. In contrast with this, the pitch p2 of the mating teeth 36 can be made longer, and the mating teeth 36 can be reduced in number, so that the manufacture of the rack 35, which requires troublesome machining, is facilitated. In this case, p1=0.5p2 or p1=1.5p2 may be used in place of p1=2.5p2.

Moreover, the unlocking lever 43 is attached to the lower end of the rack 35 so that the mating teeth 36 can be reoriented in the circumferential direction to be disengaged from the retaining pawl 37a or 37b by turning the lever 43. Thus, the unlocking means has a simple construction which requires no wide special space, and can be operated with ease.

It is to be understood that the present invention is not limited to the embodiment described above, and that various changes and modifications may be effected therein by one skilled in the art without departing from the scope or spirit of the invention.

In the case of the embodiment described above, the passengers are expected to take the seats. However, the invention may be also applied to stand-up coasters which carry passengers in a standing posture.

In the above embodiment, moreover, the imaginary cylinder 78 of the straight spinning section 73 is composed of the hoops 76 in large numbers arranged in the traveling direction of the train 3. Although the hoops have an advantage in being higher in strength, however, the structure 78 may alternatively be composed of frame members with a half-ring shape or any other suitable shape.

The lead of the helix of the rails 2 at the straight spinning section 73 need not always be constant throughout the length, and may be varied gradually or partially. The coupling means for coupling each two adjacent cars is not limited to the ball joint, and may be formed of a universal joint or any other suitable structure for the purpose.

In the body holding unit, moreover, the arrangement for urging the paired shoulder retainer arms 30 to be pushed up when the arms are unlocked is not limited to the combination of the turnbuckle 46, link lever 48, and torsion coil spring 51. Alternatively, the coupling plate 31 may be pulled or pushed up by means of a tension coil spring or compression coil spring. Further, the shoulder retainer is not limited to the paired shoulder retainer arms, and may alternatively be formed of a single U-shaped arm. Furthermore, the retaining pawls are not limited to two in number, and may be three or more.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An amusement track ride system comprising: a pair of rails forming a track; and
    at least one car traveling along the rails, the car including a chassis having an upper side and lower side, a passenger seat including a headrest area on the upper side of the chassis, and a plurality of wheel portions on the lower side of the chassis, the wheel portions being situated close to the feet of a passenger in the passenger seat, each of the wheel portions engaging one of the rails,
    the track including a spinning section wherein the paired rails extend in a helix along an inner surface of an imaginary cylinder having a central axis, the diameter of the imaginary cylinder being set so that an axis of helical rotation of the car traveling in a spin along the rails passes through the car and is substantially in alignment with the central axis of the imaginary cylinder, said paired rails extending in a helix at the spinning section being spaced so that an intermediate axis extending halfway between the rails forms a helix centering around the central axis of the imaginary cylinder.

2. The ride system according to claim 1, wherein said imaginary cylinder has a straight central axis.

3. The ride system according to claim 1, wherein said imaginary cylinder has a curved central axis with a predetermined radius of curvature.

4. The ride system according to claim 3, wherein said imaginary cylinder has a central axis including a first curve, a second curve, and a straight portion between the first and second curves.

5. The ride system according to claim 1, wherein the diameter of said imaginary cylinder is set so that the axis of helical rotation of the car extends through said headrest area of the passenger seat.

6. The ride system according to claim 1, which further comprises a plurality of said cars and coupling means for coupling the respective ends of each two adjacent cars to be rotatable relative to each other.

7. The ride system according to claim 6, wherein said coupling means includes a ball joint.

8. The ride system according to claim 1, wherein said coupling means includes a ball joint.

9. An amusement track ride system comprising:
    a pair of rails forming a track; and
    at least one car traveling along the rails, the car including a chassis, a passenger seat on the chassis, the passenger seat having a seating face and a seat back rest extending from the seating face, and a means for holding a passenger in the passenger seat,
    the holding means including:
        means for retaining the shoulders of the passenger, said shoulder retaining means for holding down the shoulders of the passenger in the passenger seat from above,
        a guide mechanism in the passenger seat, extending upward along at least a portion of the length of the seat back rest for guiding the shoulder retaining means in a substantially linear direction along the direction of the seat back rest,
        the shoulder retaining means including a coupling member operatively connected to the guide mechanism in a slidable engagement,
        means for locking the shoulder retaining means to prevent the retaining means from moving away from the shoulders of the passenger when the retaining means abuts against the shoulders of the passenger,
        means for unlocking the locking means, and
        means for urging the shoulder retainer to move away from the shoulders of the passenger.

10. The ride system according to claim 9, wherein said locking means includes a rack, provided at the seat back rest so as to extend in the moving direction of the shoulder retaining means and having a number of mating teeth arranged side by side in the moving direction, and a plurality of retaining pawls arranged side by side in the moving direction on the shoulder retaining means, for engaging the mating teeth, the pitch between the retaining pawls being different from the pitch of the mating teeth.

11. The ride system according to claim 10, wherein said rack includes a substantially columnar body and the mating teeth are arranged in the axial direction on one side of the body with respect to the circumferential direction thereof, and said unlocking means includes supporting means for supporting the rack to be rotatable around the axis of the rack between a locking position, where the mating teeth engage with the retaining pawls, and an unlocking position, where the mating teeth are disengaged from the retaining pawls, and means for rotating the rack to the unlocking position.

12. The ride system according to claim 11, wherein said rotating means includes a link rockably mounted on the chassis, an unlocking lever mounted on the rack for integral rotation therewith, a cable connecting the link and the unlocking lever, and operating means for rocking the link so that the rack is rotated to the unlocking position through the medium of the cable and the unlocking lever when the car is stopped at a predetermined stop position on the track.

13. The ride system according to claim 9, wherein said shoulder retaining means includes at least one arm protruding from the coupling member for engaging the shoulders of the passenger.

14. The ride system according to claim 13, wherein said urging means includes a support shaft mounted on the support post, a ring member rotatably supported on the support shaft, a link mechanism connecting the ring member and the coupling member, and a torsion spring provided between the support shaft and the ring member and urging the ring member in a direction such that the coupling member moves away from the passenger's shoulders.

15. An amusement track ride system comprising:
a pair of rails forming a track; and
at least one car traveling along the rails, the car including a chassis, a passenger seat on the chassis, a plurality of wheel portions operatively connected to the chassis, situated close to the feet of a passenger in the passenger seat, each of the wheel portions engaging one of the rails, and means for holding a passenger in the passenger seat,
the track including a spinning section wherein the paired rails extend in a helix along an inner surface of an imaginary cylinder having a central axis, the diameter of the imaginary cylinder being set so that an axis of helical rotation of the car traveling in a spin along the rails passes through the car and is substantially in alignment with the central axis of the imaginary cylinder,
the holding means including:
means for retaining the shoulders of the passenger, said retaining means for holding down the shoulders of the passenger in the passenger seat from above,
a guide mechanism in the passenger seat, extending upward along at least a portion of the length of the seat back rest for guiding the shoulder retaining means in a substantially linear direction along the direction of the seat back rest,
the shoulder retaining means including a coupling member with a retainer portion, said retainer portion of the coupling member operatively connected to the guide mechanism in a slidable engagement, and
means for locking the shoulder retaining means to prevent the retainer portion of the coupling member from moving away from the shoulders of the passenger when the shoulder retaining means abuts against the shoulders of the passenger.

16. The ride system according to claim 15, wherein said locking means includes a rack, provided in the seat back rest extending in the moving direction of the shoulder retaining means and having a number of mating teeth arranged side by side in the moving direction, and a plurality of retaining pawls arranged side by side in the moving direction on the shoulder retaining means, for engaging the mating teeth, the pitch between the retaining pawls being different from the pitch of the mating teeth.

17. The ride system according to claim 16, wherein said rack includes a substantially columnar body and the mating teeth are arranged in the axial direction on one side of the body with respect to the circumferential direction thereof, which further comprises unlocking means for unlocking the shoulder retaining means locked by the locking means and means for urging the shoulder retaining means to move away from the shoulders of the passenger, and wherein said unlocking means includes means for supporting the rack to be rotatable around the axis of the rack between a locking position, where the mating teeth engage with the retaining pawls, and an unlocking position, where the mating teeth are disengaged from the retaining pawls, and means for rotating the rack to the unlocking position.

18. An amusement track ride system comprising:
a pair of rails forming a track; and
at least one car traveling along the rails, the car including a chassis, a passenger seat on the chassis, having a seating face and a seat back rest extending from the seating face, and a means on the chassis for holding a passenger in the passenger seat,
the holding means including:
a shoulder retainer attached to the seat back rest, for holding down the shoulders of the passenger in the passenger seat from above,
a guide mechanism in the passenger seat for guiding the shoulder retainer to be movable in the extending direction of the seat back rest,
means for locking the shoulder retainer to prevent the retainer from moving away from the shoulders of the passenger when the shoulder retainer is guided by the guide mechanism to a position where the shoulder retainer abuts against the shoulders of the passenger, the locking means including a rack, at the seat back rest, the rack extending in the moving direction of the shoulder retainer and having a number of mating teeth arranged side by side in the moving direction, and a plurality of retaining pawls arranged side by side in the moving direction on the shoulder retainer, for engaging the mating teeth, the pitch between the retaining pawls being different from the pitch of the mating teeth,
means for unlocking the shoulder retainer locked by the locking means, and
means for urging the shoulder retainer to move away from the shoulders of the passenger.

19. An amusement track ride system comprising:
a pair of rails forming a track; and
at least one car traveling along the rails, the car including a chassis, a passenger seat on the chassis, a plurality of wheel portions operatively connected to the chassis, situated close to the feet of a passenger in the passenger seat, each of the wheel portions engaging one of the rails, and means for holding a passenger in the passenger seat,
the track including a spinning section wherein the paired rails extend in a helix along an inner surface of an imaginary cylinder having a central axis, the diameter of the imaginary cylinder being set so that an axis of helical rotation of the car traveling in a spin along the rails passes through the car and is substantially in alignment with the central axis of the imaginary cylinder,
the holding means including:
a shoulder retainer attached to the seat back rest, for holding down the shoulders of the passenger in the passenger seat from above,
a guide in the passenger seat for guiding the shoulder retainer to be movable in the extending direction of the seat back rest, and
means for locking the shoulder retainer to prevent the shoulder retainer from moving away from the shoulders of the passenger when the shoulder retainer is guided by the guide mechanism to a position where the retainer abuts against the shoulders of the passenger, the locking means including a rack, which is provided in the seat back rest so as to extend in the moving direction of the shoulder retainer and has a number of mating teeth arranged side by side in the moving direction, and a plurality of retaining pawls arranged side by side in the moving direction on the shoulder retainer, for engaging the mating teeth, the pitch between the retaining pawls being different from the pitch of the mating teeth.

20. An amusement track ride system comprising:

a pair of rails forming a track;

a plurality of cars traveling along the rails, each of the cars including a chassis having an upper side and a lower side, a passenger seat on the upper side of the chassis, and at least one pair of wheel portions oppositely disposed on the lower side of the chassis, each of the wheel portions engaging one of the rails; and means for coupling said cars;

the track including a spinning section wherein the paired rails extend in a helix along an inner surface of an imaginary cylinder having a central axis, the diameter of the imaginary cylinder being set so that an axis of helical rotation of the car traveling in a spin along the rails passes through the car and is substantially in alignment with the central axis of the imaginary cylinder, said paired rails extending in a helix at the spinning section being spaced so that an intermediate axis extending halfway between the rails forms a helix centering around the central axis of the imaginary cylinder.

21. An amusement ride system comprising:

a. a pair of rails forming a track, the rails separated from each other at a uniform distance, said rails having an axis extending half way between the rails;

b. a plurality of ring shaped ribs arranged around a central axis, said ribs along said rails at predetermined intervals and surrounding said rails in such a manner as to support said rails, said ribs defining a spinning section of said track, said paired rails extending in a helix at the spinning section, the paired rails being spaced so that the axis extending half way between the rails forms a helix around the central axis; and c. at least one car traveling along the rails, the car including a chassis, a passenger seat on the chassis, a plurality of wheel portions operatively connected to the chassis, situated close to the feet of a passenger in the passenger seat, each of the wheel portions engaging one of the rails.

22. The amusement ride system of claim 21, wherein said ring shaped ribs defining said spinning section include support, the supports arranged such that the spinning section is inclined.

23. The amusement ride system of claim 21, additionally comprising a plurality of coupled cars, the cars coupled by a ball joint.

* * * * *